United States Patent [19]

Roth

[11] 3,781,821

[45] Dec. 25, 1973

[54] SELECTIVE SHIFT REGISTER

[75] Inventor: Robert Ingersoll Roth, Briarcliff Manor, N.Y.

[73] Assignee: International Business Machines Corporation, Armonk, N.Y.

[22] Filed: June 2, 1972

[21] Appl. No.: 258,963

[52] U.S. Cl. .................. 340/172.5, 328/37, 328/193

[51] Int. Cl. .................. G11c 19/00

[58] Field of Search .................. 340/172.5, 174 SR; 328/37, 191, 193

[56] References Cited

UNITED STATES PATENTS

| | | | |
|---|---|---|---|
| 3,618,033 | 11/1971 | Nordquist et al. | 340/172.5 |
| 3,623,020 | 11/1971 | Mao | 340/172.5 |
| 3,268,740 | 8/1966 | Rywak | 328/37 |
| 3,508,212 | 4/1970 | Ault | 340/172.5 |
| 3,582,902 | 6/1971 | Hirtle et al | 340/172.5 |

*Primary Examiner*—Paul J. Henon
*Assistant Examiner*—John P. Vandenburg
*Attorney*—Frank Chadurjian et al.

[57] ABSTRACT

Information is shifted from any one or a number of stages in a shift register to any other one or other stages of a shift register by use of gating circuits connected to each stage operated by a control circuit. The gating circuits connected to each stage of the register are operative to either inhibit storage of input information therein and transfer of stored information by stage disconnect while allowing immediate passage of such information to the next succeeding stage by immediate transfer connect, or to allow storage of input information therein and transfer of stored information by stage connect while inhibiting immediate passage of such information to the next succeeding stage by immediate transfer disconnect.

7 Claims, 2 Drawing Figures

PATENTED DEC 25 1973

3,781,821

SELECTIVE SHIFT REGISTER

BACKGROUND OF THE INVENTION

Shift registers are well known in the art which employ triggerable flip-flops and steering networks associated with each flip-flop. Selective shift registers are also known in which a particular digit position may be selected to shift only a desired portion of a word contained in the register such as described in U.S. Pat. No. 3,103,580, issued Sept. 10, 1963, and assigned to the assignee of this application. In these typical prior art registers, information shift may be unidirectional or bidirectional and selection takes place by shifting a desired digit sequentially to a succeeding position on the right or left of the digit storage stage. Such circuits, while having specific application, lack versatility and require large amounts of circuitry to accomplish their desired results.

An object of this invention is to provide a shift register wherein an input stream of data may be controllably stored in any sequence.

A further object of this invention is to provide a shift register wherein information in any stage may be transferred to any further sequential stage.

SUMMARY OF INVENTION

The shift register of this invention includes any number of stages, wherein each stage is adapted to receive and store a digit of information during one time sequence and transfer the information out during the next time sequence, but differs from other similar types of register by use of a unique arrangement of gating circuits which, during the transfer sequence, control which stage of the register is to receive and store the information. Aside from the normal functions carried out by a shift register, by use of this technique, versatility is gained in that the register can be controlled so that the sequence of an input stream of information may be controllably altered to achieve coding. A more specific use of such a register may be seen when considering data compaction techniques such as described in U.S. Pat. No. 3,413,611, issued Nov. 26, 1968, for a "Method and Apparatus for the Compaction of Data."

In considering data compaction requirements and the like, if the contents of the shift register consist of groups of bits and any or all groups of bits contain bits which are superfluous for representing desired information, these superfluous bits can be deleted when it is desired to either store the contents of the shift register or to transmit the contents of the shift register perhaps over a telephone line to some other device.

When the reverse is done, or when it is desired to load the shift register from memory or from a distant device, the pertinent bits can be assembled in the shift register in their proper locations.

The foregoing and other objects, features and advantages of the invention will be apparent from the following more particular description of a preferred embodiment of the invention, as illustrated in the accompanying drawings.

DETAILED DESCRIPTION OF THE DRAWINGS

Figure 1:
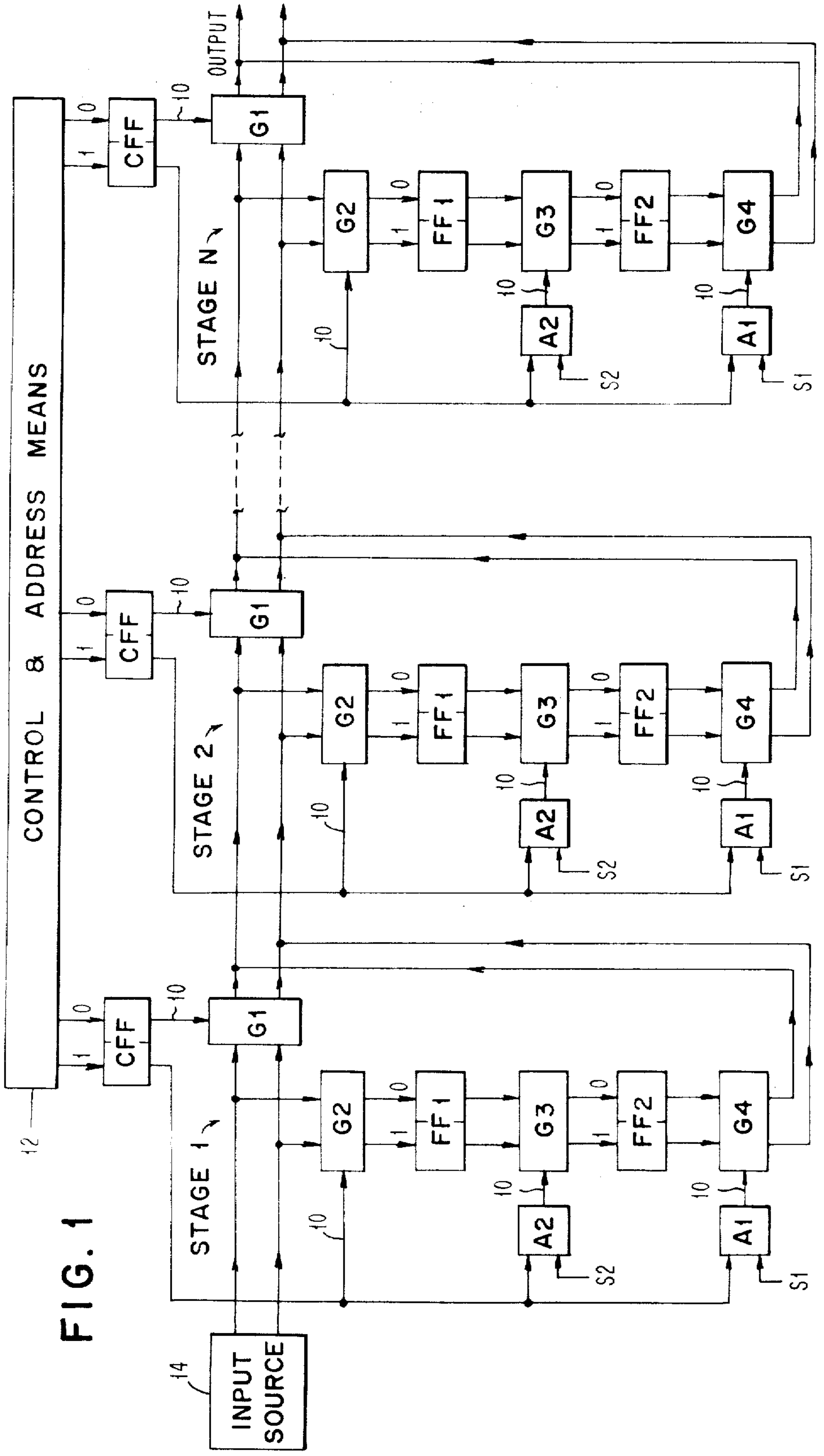
FIG. 1 is a block diagram of a shift register according to this invention.

In the circuit of FIG. 1, an $n$-stage shift register is shown. Associated with each stage is a transfer control gate G1. Each stage of the register comprises an input control gate G2 having its output connected to an input flip-flop FF1, which in turn is connected to a storage flip-flop FF2 through a storage gate G3. Each of the storage flip-flop FF2 is connected to the input of gate G1 associated with the succeeding stage and the input of gate G2 of the succeeding stage through a transfer gate G4. The gates G remain closed and are only opened as long as their control input 10 is energized. The gates G4 and G3 have their control inputs 10 energized by clock pulse sources S1 and S2, through AND gates A1 and A2, respectively. The second input to each of the gates A1 and A2, along with control input 10 of gate G2, is connected to one side of a control flip-flop CFF. The other side of the control flip-flop CFF is connected to the control electrode 10 of gate G1. Each of the control flip-flops CFF of stages 1–$n$ are in turn connected to a Control and Address means 12 or masking circuitry which controls the condition or state of each CFF of the circuit. Inputs to stage 1 of the circuit are generally indicated by a box labelled Input Source 14 connected to the inputs of gates G1 and G2 of stage 1.

Figure 2:
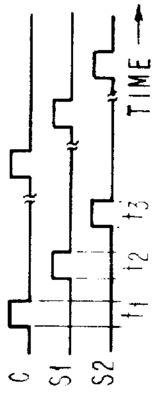
FIG. 2 is a plot of the pulse waveforms from the clock sources and control circuitry during operation of the circuit of FIG. 1.

In operation, reference will be made to FIG. 1 and FIG. 2. Assume that Control Address 12 has conditioned each CFF to the "1" state during time period $t_1$ indicated in FIG. 2. Clock pulse source S1 then energizes gate G4 of each stage during period $t_2$ through AND gate A1. Information in FF2 is then transferred through gate G4 to G2 of the next stage, which is now opened by virtue of CFF being in the "1" state, and registered in FF1. After termination of clock pulse S1, clock pulse source S2 applies a pulse, during time $t_3$, to each of the gates G3 of all stages through AND gate A2 which has its second input energized via the CFF of that stage being in the "1" state. The information contained in FF1 is then transferred to FF2 via gate G3. Each stage of the register is thus connected to perform its normal function while the associated control transfer gate is in a sense disconnected. Operation of the gates to cause normal functioning of a stage will hereafter alternately be referred to as the stage connect, and immediate transfer disconnect state.

If, in the above operation, CFF of stage 2 were set in the "0" state, the associated transfer control gate G1 of that stage would be opened while the remaining gates G2, G3 and G4 would be closed. Upon application of the clock pulse from S1 to G4 of stage 1, the information contents of FF2 in stage 1 would be immediately transferred through G1 of stage 2 to gate G2 of stage 3. Operation of stage 2 when in this state will alternately be referred to hereinafter as stage disconnect while operation of the associated gate G1 during this time will be referred to as immediate transfer connect with the combination state of the stage being stage disconnect and immediate transfer connect state. Accordingly, the control flip-flops CFF control each stage so that, when in the "0" state, storage of input information and transfer of stored information is inhibited (stage disconnect) while immediate transfer of such information to the next stage is accomplished (immediate transfer connect), while if in the "1" state, information transferred to that stage is stored therein (stage connect) while immediate transfer through the stage, via G1, is inhibited (immediate transfer disconnect).

The versatility of the shift register of FIG. 1 is further demonstrated by considering operation on an input stream of information from Input Source 14. Information from Input 14 is delivered during application of a pulse from clock source S1. Assume that the source 14 is to deliver a stream of information in the form of "1's" and "0's" and it is desired to scramble this information in accordance with a predetermined code or mask manifested by conditioning the control flip-flops CFF of each stage by the Control Address Means 12. Assume that the register of FIG. 1 is a 10-stage register and that the first three bits of the input stream are to be stored in the first three stages, the next four bits are to be stored in the next four stages and the remaining input bits are to be stored in the remaining three stages. The input stream to be registered is 1 1 1 0 1 0 1 0 1 1 and is applied from input means 14 in sequence, reading from right to left.

During time $t_1$, when the control flip-flops CFF are loaded by control address 12, the control information is registered in the CFF's as:

1 1 1 0 0 0 0 0 0 0

This control word would remain registered during three cycles of operation of the register and changed to:

0 0 0 1 1 1 1 0 0 0 during the next four cycles of operation and then changed to:

0 0 0 0 0 0 0 1 1 1 for the remaining three cycles. Thus, during the first three cycles of operation the first three stages of the shift register are conditioned to the stage connect and an immediate transfer disconnect state while the remaining stages of the register are conditioned to the stage disconnect and immediate transfer connect state, causing registration of the input information in the first three stages only as 0 1 1.

During the following four cycles of operation, the middle four stages are conditioned to the stage connect and immediate transfer disconnect state while the remaining stage of the register are conditioned to the stage disconnect and immediate tranfer connect state. Thus, the following four digits of input information are registered in the four middle stages as 0 1 0 1. During the next three cycles of operation, since all stages but the last three are conditioned in the stage disconnect and immediate transfer state, the last three digits of input information are registered in the last three stages as 1 1 1. Accordingly, the entire register exhibits the following stored information:

0 1 1 0 1 0 1 1 1 1

For data compaction techniques, further outputs, properly gated and/or isolated, could be employed by connection to the output terminals of gate G4 of each stage. In such techniques, the desired output positions are controlled by conditioning the CFF's of that stage in the "1" state while conditioning the undesired digit stage CFF's in the "0" state. This may require disconnect operation of all gates G1 through use of a further gate between the "0" state output side of the CFF's which are conditioned off or closed when data compaction type of operation is desired. Further, while a sequential type of information input is disclosed, it is apparent that, if desired, a further isolation gate could be provided in each stage, normally conditioned open, to allow information from G4 and G1 to be applied to the following stage and which could be conditioned close when information is to be inserted in parallel, through other gates, to G2 of each stage. Here each of the CFF's would be conditioned to the "1" state in order to allow parallel input.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A selective shift register comprising in combination:
- an $n$-stage register
- gating means connected to each stage of said register and selectively operative to condition each said stage in a stage disconnect and immediate transfer state or a stage connect and immediate transfer disconnect state; and
- control means connected to said gating means for controlling the states of each stage of said register.

2. The register of claim 1, wherein said control means is operative to control the transfer of information from any selected number of said stages.

3. The register of claim 2, wherein said control means is operative to control the transfer of information from any selected one of said stages to any other selected stage of said register.

4. The register of claim 1, wherein said control means includes a control register of flip-flop circuits wherein each flip-flop is connected to said gating means to control a given stage of said register.

5. The register of claim 4 wherein said gating means includes a first gating device and a second gating device each having their inputs connected to the output of the previous stage of said register.

6. A selective shift register comprising, in combination:
- an $n$-stage register;
- information input means connected to said register for sequentially applying digital input information thereto;
- gating means connected to each stage of said register and selectively operative to condition each said stage in a stage connect and immediate transfer disconnect state or a stage disconnect and immediate transfer connect state; and
- control means connected to said gating means for controlling the states of each stage of said register to store said input information in said register in any predetermined sequence.

7. A selective shift register comprising in combination:

a. an $n$-stage register comprising;

i. information input means connected to an input gating device and a transfer gating control device with the output of said transfer gating control device connected to the input of the next stage of said register;

ii. a first level digital status and storage device connected to the output of said input gating device;

iii. a first level gating device connected to the output of the first level status and storage device;

iv. a second level digital status and storage device connected to the output of said first level gating device;

v. an output gating device connected to the output of said second level status and storage device and the input to the next stage of said register;

b. a first and a second clock pulse source connected to said first level gating device and said output gating device, respectively, through respective AND circuit means, in each stage of said register;

c. control circuit means connected to the said input gating device, said transfer control gating device and said AND circuit means in each stage of said register and selectively operative on each stage to either, open said tranfer control gating device while closing all other gates of the stage, or to close said transfer control gating device while opening all other gates of the stage.

* * * * *